Dec. 21, 1965   J. P. DE ROSE   3,224,293
AUXILIARY THROTTLE-PEDAL CONTROLS
Filed Dec. 31, 1962
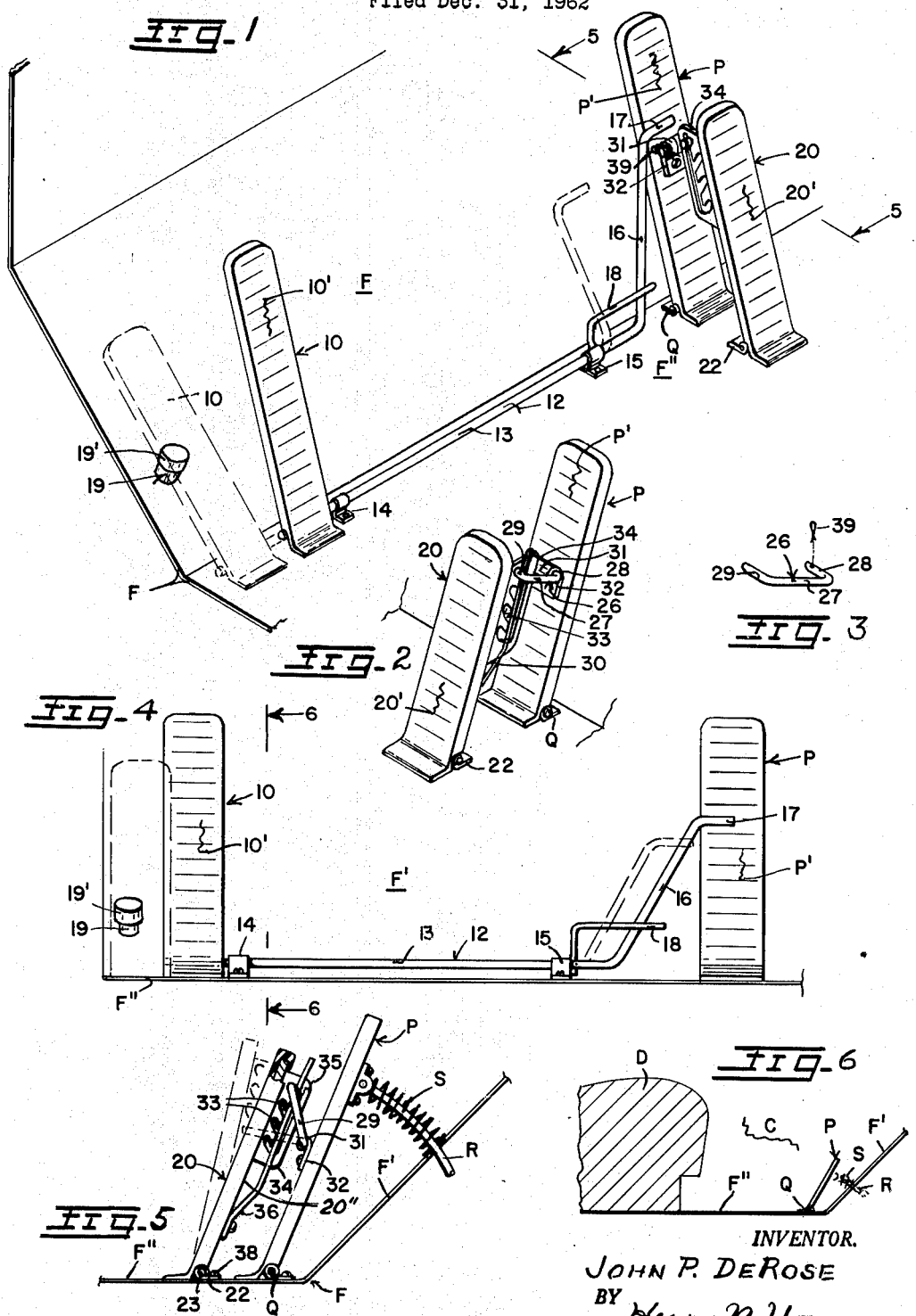
INVENTOR.
JOHN P. DeROSE
BY Henry N. Young United States Patent Office 3,224,293
Patented Dec. 21, 1965

3,224,293
AUXILIARY THROTTLE-PEDAL CONTROLS
John P. De Rose, 1708 Janero Drive, Santa Rosa, Calif.
Filed Dec. 31, 1962, Ser. No. 248,420
1 Claim. (Cl. 74—562)

The invention relates to auxiliary control pedals for use with throttle control pedals of automotive vehicles.

Recalling that the throttle control for an automobile customarily and solely comprises a hingedly mounted pedal which is engageable by one foot of the vehicle operator for its forward swinging depression against yielding spring resistance to control the activation of the vehicle motor, a primary present object is to provide an auxiliary throttle-control pedal for alternative displacement by the other foot of the seated operator, whereby both feet of the operator may be used alternatively for controlling the engine activation to thereby rest the foot and leg not then in use.

A more specific object is to provide for a maximum out-of-the-way disposal of the auxiliary throttle pedal while the same is not in use.

Also, since a throttle pedal is usually swingable about an axis which is fixedly spaced from a fixedly-disposed operator's seat for most convenient actuation by a longer-legged person, the swinging application of such a pedal by an effectively shorter-legged operator frequently involves an uncomfortable and tiring seated posture of the operator, and it is another specific object to provide an auxiliary pedal having its tread adjustably disposable with respect to the primary pedal tread to provide an adjustable rearward extension thereof to facilitate its actuation by seated vehicle operators having different effective leg lengths.

A further object is to provide an extension pedal for cooperative installation with respect to either a right-foot or left-foot throttle pedal.

An added general object is to provide auxiliary throttle control pedals of the character described which utilize particularly simple and effective and mutually independent mounting devices in their installations.

The present inventions possess other objects and features of advantage, some of which, with the foregoing, will be set forth or be apparent in the following description of typical embodiments thereof, and in the accompanying drawings, in which, FIGURE 1 is a perspective view showing in full lines an auxiliary throttle pedal for actuation by an operator's left foot in cooperative connected relation with a usual throttle pedal for right-foot operation, together with an extension pedal cooperatively related to the same throttle pedal, an inoperative disposal of the auxiliary throttle pedal being indicated in the view by a dash-line showing thereof.

FIGURE 2 is a right-side perspective front view showing of the cooperatively disposed auxiliary throttle and extension pedals.

FIGURE 3 is a perspective view of a connecting link element of the cooperative assembly of the throttle and extension pedals.

FIGURE 4 is an elevation showing in full lines solely the cooperative throttle pedals, and in dash lines a non-cooperative relation of said pedals.

FIGURE 5 is an elevation taken from an upright plane through the line 5—5 in FIGURE 1.

FIGURE 6 is a reduced schematic side elevation taken from the line 6—6 in FIGURE 5 and indicating the relation of the throttle pedals to an automobile floor and seat.

As particularly indicated in FIGURES 1 and 4, an auxiliary left-foot throttle-control pedal 10 is swingably mounted in an automobile operator's compartment C at and in front of the operator's seat D and to the left side of a usual throttle pedal P which is disposed for its actuation by a seated vehicle operator's right foot, and to the left of any steering post (not shown) or of brake-control or clutch-control pedals (not shown) provided above the compartment floor F at a forward floor portion F' which slopes upwardly from the bottom floor portion F" extending from beneath the seat D to the portion F'. The present installed pedal P comprises a rigid tread-mounting plate which is swingably hinged to the bottom floor portion F" at an attaching bracket Q, has a usual carburetor control rod R extending forwardly from it through the floor portion F' to a fuel-supply carburetor (not shown), is suitably biased by a spring S for a normal disposal of the pedal P in an upstanding and rearwardly swung position, and provides a rearwardly-directed tread face P' for engagement by a vehicle operator's foot.

The elongated tread-mounting plate of the auxiliary left-foot pedal 10 is fixedly attached at one end to the left end portion of a control-rod or shaft 12 having a straight shank portion 13 carrying the pedal 10 and extending to the left of the pedal P in parallel and substantially aligned relation to the swinging axis of said pedal in the bracket Q and is journaled in slide bearings provided by attaching brackets 14 and 15 fixed to the floor portion F". An intermediate and obliquely radial arm portion 16 of the rod 12 is provided at its end nearest the pedal P, with a crank pin portion 17 extending from the outer end of the arm 16 oppositely of the journaled rod portion 13 and in coplanar and parallel relation thereto. The bearing-providing brackets 14 and 15 are so spaced from the mounted pedal 10 and the inner end of the crank arm 16 that the rod 12 is axially shiftable between an operative position (shown in full lines in FIGURES 1 and 4) for the pedal 10 in which the crank-pin rod portion 17 is engageable with the rearward or tread face P' of the pedal P and an inoperative position (shown in dash lines) in which the crank pin portion 17 is shifted to the left with the control rod 12 and away from its engagement with the pedal P and may then rest upon the floor portion F".

Preferably, and as shown, a spring arm 18 constantly and laterally engages the forward side of the arm 16 of the rod 12 and comprises the extending portion of a length of spring wire or the like having its other end fixedly related to the bearing bracket 15, as by its clamped engagement between the bracket base and the mounting floor. The spring arm 18 is operative to constantly bias the operatively-positioned end 17 of the rod 12 against the opposed and engaged tread face P' of the throttle pedal, while then permitting an operative swinging of the throttle pedal by an actuation by the vehicle operator of either of the throttle-control pedals P or 10. While, however, the rod 12 is shifted to the left to dispose its end 17 to the left of the throttle pedal P, the spring arm 18 is operative against the rod arm 16 for urging a forward swinging of the rod portions 16 and 17 toward the floor portion F' forwardly of the axis of rotation of the rod, whereby said rod portions and the rod-carried auxiliary pedal 10 may be disposed and held in non-interfering relation to the operator's left foot for the sole use of the throttle pedal P.

It will now be noted that when, as illustrated, the end portion 17 of the control rod 12 engages the tread face P' of the throttle pedal P, the tread face 10' of the left-foot pedal 10 is preferably arranged to be substantially parallel to and coplanar with the face P', whereby a change from a right-foot actuation of the pedal P to a left-foot actuation of the pedal 10 for controlling the position of the pedal P may be facilitated without an appreciable shifting of the operator's pedal-operating position upon the vehicle seat D. Also, the form of the control rod 12 is preferably such that the plane of the rod portions 16 and 17 is substantially coplanar with the forward face 10″ of the plate of the mounted auxiliary pedal 10 whereby, when the rod 12 is shifted to the left to dispose the rod end portion 17 from in front of the throttle pedal P, the rod may be rotated to engage its end portion 17 against the forward floor portion F′ while simultaneously disposing the forward face of the then inoperatively-disposed auxiliary pedal 10 close to the opposed part of said floor portion.

Preferably, and as indicated, the tread faces P′ and 10′ of the respective pedals P and 10 are provided by suitably formed and attached pad members of relatively soft and flexible material which have extending lower end portions thereof constantly engaged with the floor F′ for preventing any catching of an operator's heel between the bottom pedal ends and the floor thereat when either pedal is pressed forwardly during their use. Also, in case, as is indicated in FIGURES 1 and 3, the forward floor portion F′ mounts an element for toe control, and particularly a two-way electrical snap switch 19, having a control push button 19′ exposed within the compartment C opposite the inoperatively-disposed left-foot pedal 10, whereby said pedal may then be actuated against the button 19′ for controlling the condition of the switch 19, which may, for instance, selectively control the energizing of high-and-low beam headlamps (not shown).

Noting that the treads of throttle pedals of automobiles are frequently spaced further from the operator's seat than are the treads of any brake and/or clutch pedals (not shown) provided opposite the floor F, a means is also desirably provided for adjusting the effective distance of the throttle pedal tread P′ from the vehicle seat D, such a means being associatable with the throtle pedal P and/or the present auxiliary left-foot pedal 10. Accordingly, I provide auxiliary throttle-operating pedals 20 which are independently mountable upon the forward automobile floor portion F′ for use to provide rearward extensions of either throttle control pedal P or 10, one pedal 20 being particularly shown as cooperatively linked with the primary throttle pedal P. It will, of course, be obvious that an extension pedal 20 is providable in association with an operatively positioned auxiliary left-foot throttle pedal 10, since, even though the automobile seat D may be spatially adjustable with respect to an accelerator pedal to be used, it is usually desirable to avoid having to adjust the seat position for best-seated dispositions of different operators with respect to the original pedals P or 10. A present auxiliary pedal 20 is particularly shown as having its body plate hingedly mounted on an attaching hinge-leaf plate 22 fixed to the rearward floor portion F″ in a position rearwardly of the zone of travel of the throttle pedal P.

A present extension pedal 20 generally resembles a throttle-control pedal P or 10 in appearance, is disposable rearwardly of and opposite the associated throttle pedal, and has its body plate provided with a tread face 20′ at its rearward side, while its forward face side 20″ faces the tread P′ of the opposed throttle pedal P. A pedal 20 is hingedly attached to the rearward floor portion F″ by a hinge pin 23 engaged through axially spaced knuckle ears provided at the lower end of the pedal plate and a knuckle ear provided by the fixed floor-mounted hinge-leaf plate 22 aligned and disposed between the hinging ears of the pedal 20. Since the hinging axes of the pedal P and the pedal 20 are laterally spaced in parallel relation, the adjustable linkage between these pedals is essentially such as to provide for any necessary distortion of the quadrangle having one pair of its opposite sides defined between the opposed pedal plates, and the other pair of its sides defined between the axes of swinging of said plates and the plane in which the linkage is necessarily operative in a variable angular relation to said linked plates.

Essentially, the linkage between an extension pedal 20 and a throttle pedal P or 10 is such that the displacement of an operatively mounted pedal 20 is arranged to effect an appropriate and adjustably variable displacement of the throttle pedal P controlled by and with it. In its present embodiment, the aforesaid linkage comprises a rigid U-shaped link member 26 having an intermediate pedal-linking portion 27 connecting mutually parallel side or arm portions 28 and 29 thereof for cooperative use to connect the link portion 27 between a throttle pedal and an associated extension pedal 20. As shown, the link member 26 is designed to have the side arm 28 thereof journaled in a tubular knuckle ear 31 provided by a member 32 fixed to the plate of the associated throttle pedal P or 10 at the tread side thereof, while the other arm 29 of the link 26 is selectively engaged in a notch 33 of a line thereof directed longitudinally of the extension pedal 20 and shown as provided by a member 34 mounted on the side 20″ of said pedal, with the arm 29 normally held in a selected notch 33 by the action of a pedal-mounted detent means.

The present member 34 is of angle section having a base flange thereof suitably fixable as a mounting base portion to and against the forward face 20″ of the pedal 20 in longitudinally extending relation thereto and having its other flange perpendicular to the base flange and provided with an interior transverse longitudinal slot 35 which provides the line of notches 33 in and along the slot edge closest to the plane of the base flange of the member 34. As particularly shown, the detent means for releasably holding the link arm 29 in a selected notch 33 comprises a spring arm 36 which has one end fixedly anchored to the pedal plate 20 at a point thereof between the hingedly attachable pedal end and the base flange of the member 34 and adjacent the notch-providing flange in a line substantially opposite the line of the open notch ends, whereby an appropriate swinging displacement of said spring arm portion away from the base flange is effectible to permit the release and adjusting movement of the link arm 29 between the notches in their line. For facilitating the described releasing displacement of the spring arm 36 with respect to the link arm 29 for permitting an adjusted disposal thereof in another notch 33, the free end of said spring arm preferably extends beyond the member 34 toward the free pedal extremity for its manual displacement during an adjustment of the link side 29 between the notches 33.

Having at hand an extension pedal 20 with its body plate hingedly attached to the hinge leaf 22 and fixedly mounting the notch-providing member 34 and the spring arm 36 on the face 20′ of the pedal, said assembly is adjustably disposed on the floor portion F′ with the pedal 20 opposite the tread face of an undepressed throttle pedal P or 10 in substantially parallel and rearwardly spaced relation thereto. With the pedal 20 thus disposed, it is so spaced from the opposed throttle pedal that the knuckle ear 31 of the member 32 may receive and journal the link arm 28 of the link member while the arm 29 of the link member is engaged in the notch 33 which is furthest from the hinging axis for the pedal, and the hinge 22 thereof is then releasably attached to the floor portion F″, as by a screw 38 engaged in the rearward floor portion F″, whereby the releasable mounting of the link 26 in the described connecting relation to the associated pedals may be readily effected (FIGURES 1 and 2 and 5).

When the arm 28 of the link 26 has been operatively journaled in the knuckle ear 31, it is arranged to extend through and beyond said ear whereby its protruding end preferably mounts a suitable releasable retaining element 39 which may comprise, for instance, a cotter key removably engaged in a hole provided through the protruding end of the link arm 28, whereby the extension pedal 20 need not be dismounted during a re-setting of the link arm 29 in a different notch 33. It will also be understood that the unitary link member 26 would be so rigid that, while its arms cooperatively engage the ear 32 and a notch 33, the link may not be distorted when a shifting pressure is exerted upon the associated throttle pedal by a forward swinging of the pedal 20.

From the foregoing description taken in connection with the accompanying drawings, the advantages of the present auxiliary throttle control pedals will be readily understood by those skilled in the art to which the invention appertains. While I have shown and described structures and arrangements which I now consider to comprise preferred embodiments of my invention, 1 desire to have it understood that the showings are primarily illustrative, and that such changes and developments may be made, when desired, as fall within the scope of the following claim.

I claim:

In combination with a first vehicle-controlling accelerator pedal extending upwardly from the vehicle floor in hinged relation thereto, and in front of a seat fixedly disposed rearwardly of the pedal, for an engagement and forward swinging actuation of the pedal against a biasing resistance means by a foot of an operator of the vehicle occupying the seat and engaging the tread of the first pedal for actuating the same, a second pedal extending upwardly from the vehicle floor in hinged relation thereto and disposed opposite the first pedal between it and the seat for its engagement and forward swinging actuation about an axis parallel to said axis of swinging of the first pedal by the corresponding foot of a first vehicle operator, and a link means of adjustable length directly and hingedly and releasably connecting the pedals and comprising a rigid U-shaped element having parallel arms, with one said pedal provided with a bearing journaling one arm of the link element while the other pedal is provided with a line of notches extending longitudinally thereof for selectively receiving the other arm of the link element whereby the mutual transverse spacing of the pedals is adjustably variable to so position the second pedal with respect to the first as to provide for the use of the installed second pedal by operators having shorter effective leg lengths than the first operator.

References Cited by the Examiner

UNITED STATES PATENTS

| | | | |
|---|---|---|---|
| 112,162 | 2/1871 | Mills | 74—561 |
| 789,813 | 5/1905 | Longley | 74—564 X |
| 1,441,765 | 1/1923 | White | 74—513 |
| 1,468,571 | 9/1923 | McGinley | 74—513 |
| 1,671,169 | 5/1928 | Swain | 74—562 X |
| 1,826,968 | 10/1931 | Townsend et al. | 74—564 X |
| 2,175,772 | 10/1939 | Gintling | 74—562.5 |
| 2,202,126 | 5/1940 | Tercero | 74—562.5 |
| 2,302,436 | 11/1942 | Felton | 74—562.5 |
| 2,504,056 | 4/1950 | Townsend | 74—562 X |
| 2,645,948 | 7/1953 | Beckman | 74—562.5 |
| 2,804,783 | 9/1957 | Begin | 74—562 |
| 2,944,439 | 7/1960 | Dalton | 74—562 |
| 3,108,489 | 10/1963 | Self | 74—562.5 |

FOREIGN PATENTS 7,115 of 1915 Great Britain.

BROUGHTON G. DURHAM, *Primary Examiner.*